Patented Mar. 27, 1923.

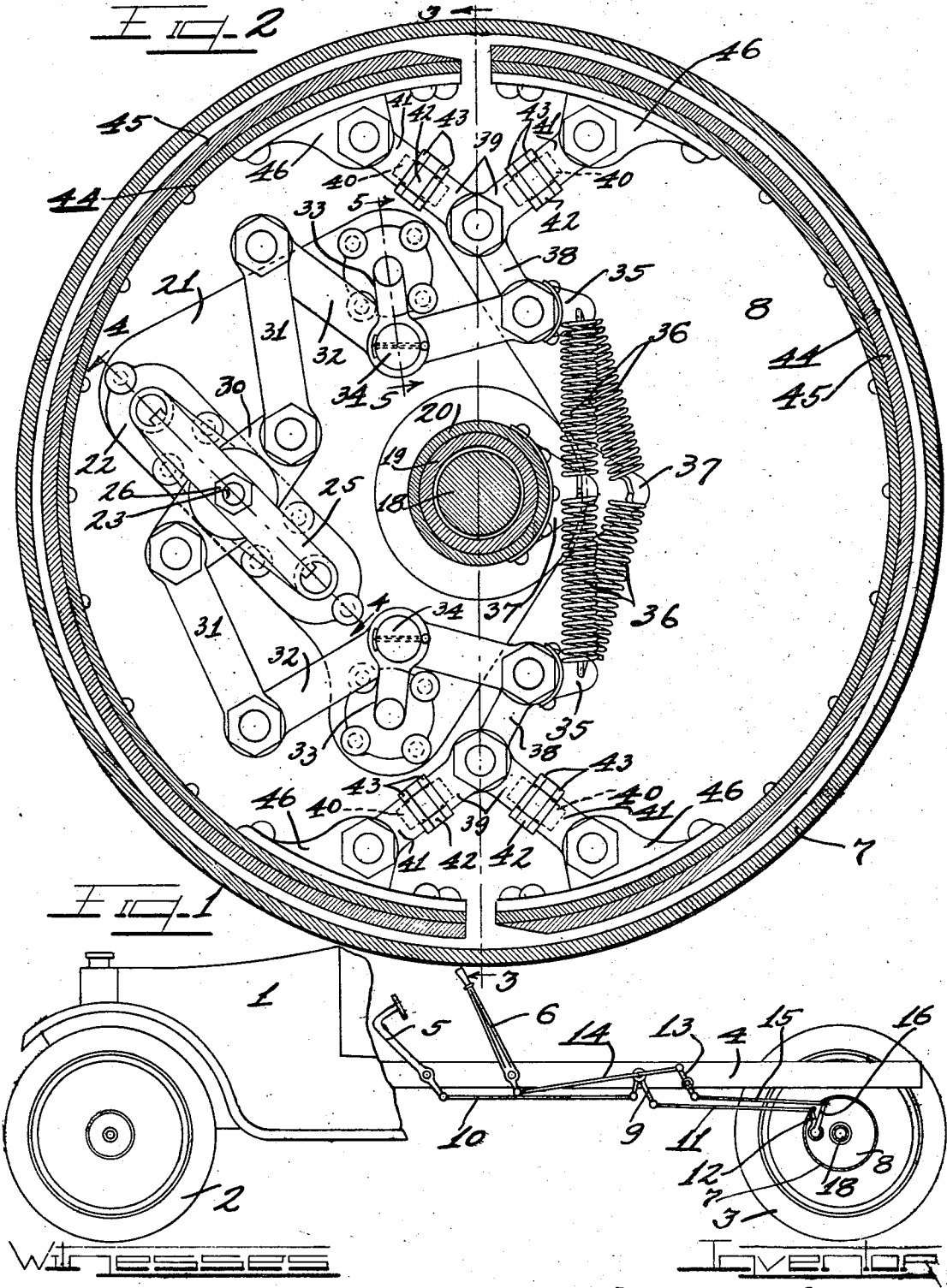

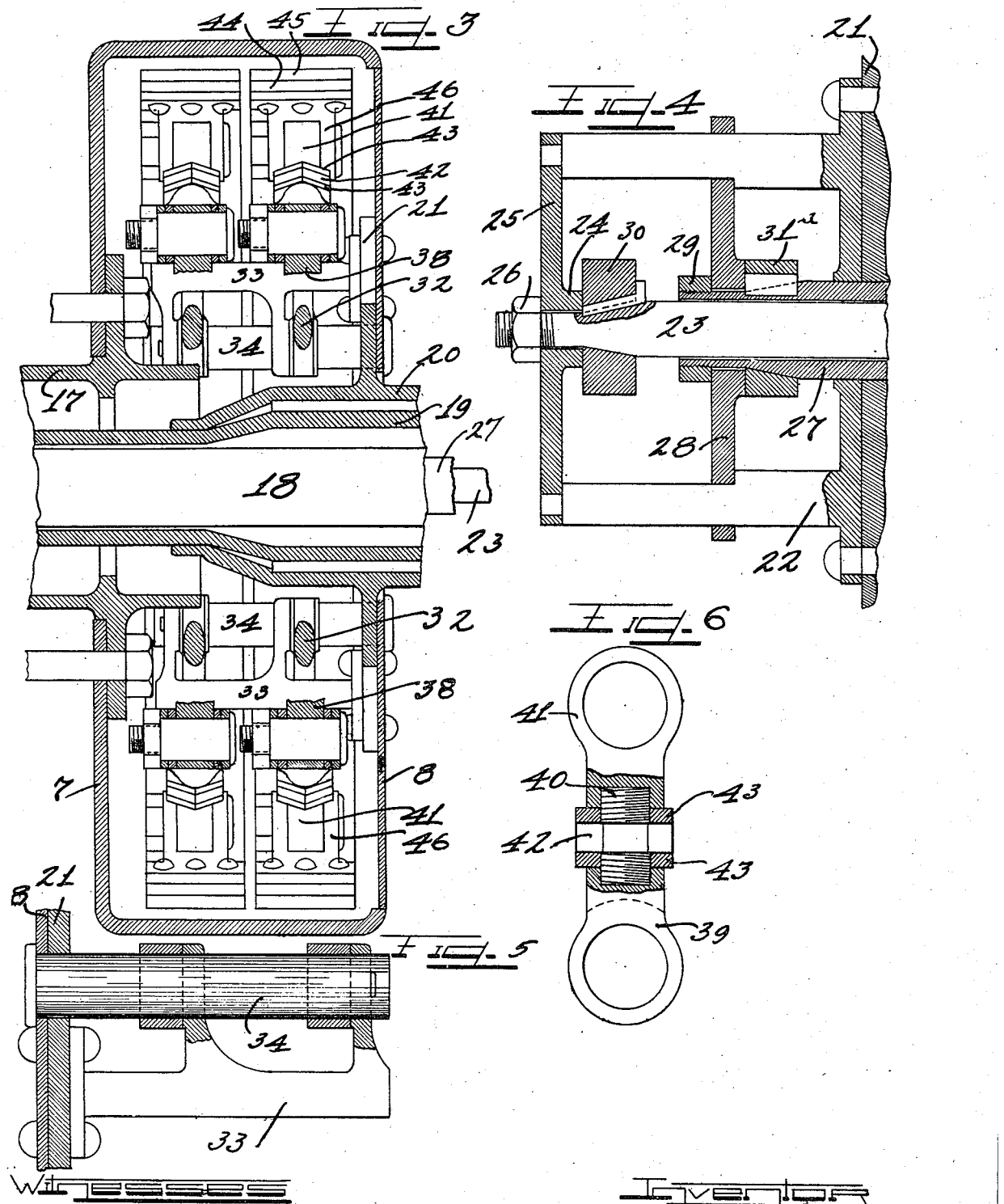

1,449,844

UNITED STATES PATENT OFFICE.

BERNARD C. TANSEY, OF CHICAGO, ILLINOIS.

AUTOMOBILE BRAKE.

Application filed December 20, 1920. Serial No. 431,809.

*To all whom it may concern:*

Be it known that I, BERNARD C. TANSEY, a citizen of the United States, and a resident of the city of Chicago, in the county of Cook and State of Illinois, have invented certain new and useful Improvements in an Automobile Brake; and I do hereby declare that the following is a full, clear, and exact description of the same, reference being had to the accompanying drawings, and to the numerals of reference marked thereon, which form a part of this specification.

This invention relates more particularly to an improved type of an automobile brake mechanism wherein split brake bands disposed within a brake drum are adapted to be operated either by a foot pedal or by an emergency brake lever through spring controlled toggle mechanisms which are connected to the split brake band members at a plurality of points to insure a uniform frictional engagement between the brake bands and the inner peripheral surface of the brake drum when either the foot pedal or the emergency lever is operated.

It is an object of this invention to provide a brake device adapted to be operated against the inner peripheral surface of a brake drum from either a foot pedal or emergency lever of an automobile.

It is also an object of this invention to provide a brake device wherein brake band segments disposed within a brake drum are connected to one another and operable by spring controlled link mechanisms.

Another object of the invention is the construction of a brake having semi-circular brake band segments adapted to be simultaneously moved into frictional engagement with the inner peripheral surface of a brake drum by toggle mechanisms connected with the end portions of said brake band segments.

A further object of the invention is to provide a brake drum with two independently operable brake devices each having a plurality of brake band segments connected to one another by a plurality of simultaneously operable spring controlled link mechanisms adapted to be operated from the exterior of the brake drum.

It is furthermore an object of this invention to construct a brake device wherein the adjacent ends of brake band segments are connected by adjustable link mechanisms adapted to be operated by external means to cause the brake band segments to be forced outwardly away from one another and into frictional engagement with a brake drum against the action of controlling springs provided for the purpose of automatically returning the brake band segments to normal release position when said operating means is released.

It is an important object of this invention to provide an automobile brake mechanism of simple and effective construction disposed within a brake drum and operable by a plurality of independent means to cause actuation of toggle mechanisms which when actuated are adapted to force brake band segments outwardly into frictional engagement with the brake drum.

Other and further important objects of this invention will be apparent from the disclosures in the specification and drawings.

The invention (in a preferred form) is illustrated in the drawings and hereinafter more fully described.

On the drawings:

Figure 1 is a fragmentary side elevation of an automobile with parts broken away to disclose a brake mechanism embodying the principles of this invention.

Figure 2 is an enlarged sectional elevation of the brake with the brake drum and brake band in section.

Figure 3 is a section taken on line 3—3 of Figure 2 with parts in elevation.

Figure 4 is an enlarged fragmentary detail taken on line 4—4 of Figure 2.

Figure 5 is an enlarged fragmentary detail section taken on line 5—5 of Figure 2 showing parts in elevation.

Figure 6 is an enlarged elevation of one of the adjustable links partly broken away.

As shown on the drawings:

The reference numeral 1 indicates an automobile having front wheels 2, rear wheels 3 and chassis sills 4. The automobile is provided with a foot pedal 5 and with an emergency lever 6 pivotally mounted in position as illustrated in Figure 1. Each rear wheel 3 is equipped with a brake drum 7 having a stationary closure plate 8 for closing the inner side thereof. Pivotally supported by the chassis sills 4, is a member 9, one arm of which has pivotally attached thereto one end of a service brake rod 10. The forward end of the rod 10 is pivotally connected with the lower end of the foot pedal 5 below the pivot point thereof. Connected with another arm of the member 9 is one end of a connecting rod 11, the rear end of which is pivotally connected to a primary or service actuating crank or arm 12. Also pivotally supported by the chassis sills 4 is a member 13 having one arm thereof connected to the rear end of an emergency brake rod 14. The front end of the rod 14 is pivotally connected to the lower end of the emergency lever 6. Pivoted to a downwardly directed arm of the member 13 is the forward end of an emergency connecting rod 15, the rear end of which is pivotally connected to an emergency crank or arm 16.

The brake drum 7, as shown in Figure 3, is supported on a rear wheel hub 17 to rotate with the wheel. Projecting through the wheel hub is a rear axle or drive shaft 18 to which the rear wheel is attached. The axle 18 is enclosed by an axle housing 19. A rear axle sleeve 20 is secured around the housing 19 and has integrally formed at right angles thereon a brake mechanism supporting plate 21, to which the plate 8 is riveted. Rigidly secured on the inner face of the supporting plate 21 is a bearing support 22 for supporting an operating shaft 23 on the outer end of which the emergency crank or arm 16 is secured. The inner portion of the operating shaft 23 projects through the plates 8 and 21 and has the inner end journalled in a bearing sleeve 24 of a cross member 25, the ends of which are supported on the arms of the bearing support 22. A nut 26 is threaded onto the inner end of the shaft 23. The service crank 12 is secured to the outer end of a service operating sleeve or shaft 27 which surrounds the shaft 23 and projects into the brake drum. The inner threaded end of the service operating shaft 27 is journalled in a bearing collar of a cross member 28, the ends of which are supported on the arms of the support 22. A nut 29 is threaded onto the inner end of the sleeve 27. Keyed or otherwise secured on the emergency operating shaft 23 between the cross members 25 and 28 is an emergency brake operating link or arm 30. A service brake operating link 31ª is keyed or otherwise secured on the service operating sleeve 27 between the cross member 28 and the base of the support 22.

As illustrated in Figure 3, two brake mechanisms are disposed within the brake drum. The two brake mechanisms are constructed substantially alike, one of said mechanisms being a service brake mechanism operable by the crank arm 12 when the foot pedal 5 is depressed, while the other mechanism is an emergency brake mechanism adapted to be operated by the crank arm 16 when the emergency lever is operated. Since both brake mechanisms are substantially of the same construction, the emergency brake mechanisms only will be described in detail.

As shown in Figure 2, the emergency brake link 30 is secured on the operating shaft 23 to be rocked or partially rotated thereby when operated. Pivotally engaged on each end of the link 30 is one end of a link or double clevis bolt 31 the other end of which is pivotally connected to one end of a bell crank 32. Rigidly secured on the supporting plate 21 are two brackets 33 each supporting a shaft 34 to afford a support for the bell cranks 32. The other end of each of the bell cranks 32 is clevised and has secured thereto an anchor port or lug 35, to which one end of a coiled control spring 36 is attached. The other end of each of the springs 36 is connected to an anchor port or arm 37 rigidly secured on the axle sleeve 20. The anchor port 37 for the service brake mechanism is also secured on the sleeve 20 and is slightly larger than the emergency anchor port. Pivotally connected to the clevis arm of each of the bell cranks 32 is one end of a double clevis bolt 38. The other clevis end of each bolt 38 is pivotally connected to the clevised ends 39 of two adjustable links. Adjustably connected to each clevised bolt end 39 by means of a right and left screw 40 is an apertured plain bolt end 41. Each right and left screw 40 has integrally formed on the middle thereof a nut 42 to permit the screw to be rotated to adjust the bolt ends with respect to one another. Lock nuts 43 are provided on each screw 40 to hold the same locked in an adjusted position.

Disposed within the brake drum 7 is an emergency brake band and a service brake band. Each brake band comprises two semi-circular brake segments 44 each having a brake lining or strip 45 secured on the outer peripheral surface thereof adjacent the inner peripheral surface of the brake drum. Rigidly secured on the inner surface near each end of each of the brake band segments 44 is a clevised shoe or expansion lug 46. Pivotally connected to said clevised brake band shoes 46 are the plain bolt ends 41 of the adjustable bolt members. It will thus be noted that the adjacent ends of the brake band segments are connected by means of a pair of adjustable bolts. The respective brake band segments are adapted to be operated by the toggle or link mechanisms above described when the emergency lever or the foot pedal is operated. The coiled springs 36 act to hold the brake band segments in normal or release position out of frictional engagement with the brake drum.

The operation is as follows:

The brake mechanisms are mounted within the brake drums 7 of the rear wheels 3 of the automobile and are adapted to be operated simultaneously by depressing the service foot pedal 5 or by operating the lever 6. The service brake connecting rods 11 are connected by means of a transverse brake shaft to the pivoted member 9, which in turn is connected by means of the brake rod 10 to the foot pedal 5. The emergency brake connecting rods 15 are connected to the pivoted member 13. The member 13 is connected by means of the brake rod 14 with the emergency lever 6.

There is a service brake mechanism and an emergency brake mechanism in each brake drum 7. Said brake mechanisms are adapted to be operated independently of one another as desired by operating the service foot pedal 5 and the emergency lever 6 respectively. Of course both the service brake mechanism and the emergency brake mechanism may be actuated simultaneously by operating the foot pedal 5 and the emergency lever 6 at one and the same time.

When it is desired to bring the emergency brake mechanism into operation, the emergency lever 6 is pulled rearwardly thereby causing the crank arm or lever 16 to swing rearwardly to partially rotate or rock the brake operating shaft 23. This operation of the shaft 23 causes the actuating arm 30 to swing in a clockwise direction looking at Figure 2, thereby simultaneously operating the toggles or links 31, which in turn operate the two bell cranks 32 against the action of the controlling springs 36 which are tensioned. The clevised ends of the bell cranks 32 are thus moved outwardly and cause the connecting toggles or links 38 to force the adjustable links 39—41 outwardly to move the brake band segments 44—45 outwardly into frictional engagement with the inner peripheral surface of the brake drum 7. The required braking of the rear automobile wheels is thus obtained. Upon release of the emergency lever 6, the tensioned springs 36 act as a quick release mechanism to automatically draw the brake band segments out of frictional engagement with the brake drum and also serve to return the toggle or link mechanisms back into normal position.

The service brake mechanisms operate exactly the same as the emergency brake mechanisms when the foot pedal 5 is depressed. In this case, however, the brake rods 11 throw the crank arms 12 rearwardly to operate the operating sleeve shafts 27 and the operating links 31ª to cause operation of the service brake bands by the service toggle mechanisms.

The bolts or links 39—41 are adapted to be adjusted in length to regulate the frictional contact which the brake band segments make with the brake drum. The links 39—41 are adjusted by turning the nuts 42 thereby turning the right and left screws 40 to adjust the link members 39 and 41 with respect to each other. When the links are adjusted to the length desired the lock nuts 43 are adjusted to hold the screws 40 locked in adjusted position.

I am aware that numerous details of construction may be varied through a wide range without departing from the principles of this invention, and I therefore do not purpose limiting the patent granted otherwise than necessitated by the prior art.

I claim as my invention:

1. A brake device comprising a brake drum, a plurality of brake band segments therein, an operating shaft projecting into said brake drum, an operating link engaged on said shaft, adjustable bolts pivotally connected to said segments, a bell crank pivotally mounted in said drum, a bolt toggled to said operating link and to one end of said bell crank, a connecting bolt pivotally connected to the other end of said bell crank and to said adjustable bolts, means for operating said shaft to cause said pivotally connected links and bolts to force said brake band segments outwardly away from one another into frictional braking engagement with said brake drum, and a spring connected to said bell crank for returning said brake band segments back into release position after a braking operation.

2. An automobile brake comprising a brake drum, operating shafts projecting into said drum, an emergency brake band and a service brake band disposed within said drum, an emergency operating link on one of said shafts, a service operating link on the other of said shafts, emergency toggle mechanisms in said drum connected with said emergency operating link and with said emergency brake band, service toggle mechanisms in said drum connected with said service operating link and with said service brake band, means connected with said shafts for operating the same independently of one another to cause movement of said emergency brake band or said service brake band into frictional engagement with said brake drum, and springs connected to said toggle mechanisms for returning the brake bands to normal release position when said operating means are released.

In testimony whereof I have hereunto subscribed my name in the presence of two subscribing witnesses.

BERNARD C. TANSEY.

Witnesses:
 FRED E. PAESLER,
 EARL M. HARDINE.